US008898121B2

(12) United States Patent
Amit et al.

(10) Patent No.: US 8,898,121 B2
(45) Date of Patent: Nov. 25, 2014

(54) MERGING ENTRIES IN A DEDUPLICATION INDEX

(75) Inventors: Jonathan Amit, Yehud (IL); Corneliu M. Constantinescu, San Jose, CA (US); Joseph S. Glider, San Jose, CA (US); Shai I. Tahar, Petach Tikva (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/482,820

(22) Filed: May 29, 2012

(65) Prior Publication Data

US 2013/0325821 A1 Dec. 5, 2013

(51) Int. Cl.
*G06F 17/30* (2006.01)

(52) U.S. Cl.
USPC .......................................... 707/692

(58) Field of Classification Search
CPC .......... G06F 17/3015; G06F 17/30156; G06F 17/30159
USPC .......................................... 707/692
See application file for complete search history.

(56) References Cited

U.S. PATENT DOCUMENTS

| 7,962,452 B2* | 6/2011 | Anglin .......................... 707/645 |
| 2010/0037118 A1 | 2/2010 | Saliba et al. |
| 2010/0088296 A1* | 4/2010 | Periyagaram et al. ........ 707/705 |
| 2010/0250501 A1 | 9/2010 | Mandagere et al. |
| 2011/0066628 A1 | 3/2011 | Jayaraman |
| 2011/0066666 A1 | 3/2011 | Takaoka et al. |
| 2011/0218972 A1* | 9/2011 | Tofano .......................... 707/692 |
| 2011/0225191 A1 | 9/2011 | Xie |
| 2011/0238635 A1 | 9/2011 | Leppard |
| 2011/0246741 A1* | 10/2011 | Raymond et al. ............. 711/170 |
| 2012/0158670 A1* | 6/2012 | Sharma et al. ................ 707/692 |

FOREIGN PATENT DOCUMENTS

| CN | 102024032 | 4/2011 |
| CN | 102156736 | 8/2011 |

OTHER PUBLICATIONS

Anonymous, "A method for reducing information leakage via cross-user deduplication mechanisms," Sep. 14, 2010, pp. 1-3, downloaded from IP.com, IP.com No. IPC0M000199656D, United States.

IBM, "Data DeDuplication Ratio based License Charge," Mar. 4, 2009, pp. 1-3, downloaded from IP.com, IP.com No. IPC0M000180085D, United States.

(Continued)

*Primary Examiner* — Joshua Bullock
(74) *Attorney, Agent, or Firm* — David W. Victor; Konrad, Raynes, Davda and Victor LLP

(57) ABSTRACT

Provided are a computer program product, system, and method for merging entries in a deduplication index. An index has chunk signatures calculated from chunks of data in the data objects in the storage, wherein each index entry includes at least one of the chunk signatures and a reference to the chunk of data from which the signature was calculated. Entries in the index are selected to merge and a merge operation is performed on the chunk signatures in the selected entries to generate a merged signature. An entry is added to the index including the merged signature and a reference to the chunks in the storage referenced in the merged selected entries. The index of the signatures is used in deduplication operations when adding data objects to the storage.

18 Claims, 8 Drawing Sheets

(56) References Cited

OTHER PUBLICATIONS

Zeng, Li-Fang et al., "Improving Data Locality and Reducing False-Sharing Based on Data Fusion," Jan. 2004, pp. 1-10, Chinese Journal of Computers, vol. 27, No. 1., China, (English-language Abstract provided).

Patterson, H., et al., "SnapMirror®: File System Based Asynchronous Mirroring for Disaster Recovery," Jan. 28-30, 2002, pp. 1-14, Proceedings of the FAST 2002 Conference on File and Storage Technologies, USENIX Association, Berkeley, California, United States.

Wang, G., et al., "Research on a clustering data de-duplication mechanism based on Bloom Filter," Int'l Conf. on Multimedia Technology, Oct. 2010, pp. 1-5, IEEE, United States, Oct. 7, 2013.

Wei, J., et al., "DBA: A Dynamic Bloom Filter Array for Scalable Membership Representation of Variable Large Data Sets," 19th IEEE International Symposium on MASCOTS, Jul. 2011, pp. 1-3, IEEE Computer Society, United States.

Wei, J., et al., "MAD2: A Scalable High-Throughput Exact Deduplication Approach for Network Backup Services," IEEE 26th Symp. on MSST, May 2010, pp. 1-14, IEEE, United States.

Zhou, Y., et al., "The Multi-queue Replacement Algorithm for Second Level Buffer Caches," In Proceedings of the USENIX Annual Technical Conference, Jun. 2001, pp. 1-15, USENIX Association, Boston, United States.

U.S. Appl. No. 13/460,653, filed Apr. 30, 2012, entitled "Deduplicating Storage with Enhanced Frequent-Block Detection", invented by David D. Chambliss et al. pp. 1-43.

\* cited by examiner

Received Object Chunk Signature Information

MERGING ENTRIES IN A DEDUPLICATION INDEX

FIELD OF THE INVENTION

The present invention relates to a computer program product, system, and method for merging entries in a deduplication index.

DESCRIPTION OF THE RELATED ART

Data deduplication is a data reduction technique for eliminating redundant data to improve storage utilization. Deduplication reduces the required storage capacity because only one copy of a unique data unit, also known as a chunk, is stored. Disk based storage systems, such as a storage management server or Virtual Tape Library (VTL), may implement deduplication technology to detect redundant data chunks and reduce duplication by avoiding redundant storage of such chunks. Storage-based data deduplication reduces the amount of storage needed for a given set of files and is most effective in applications where many copies of very similar or even identical data are stored on a single disk, which is common. In the case of data backups, which are routine and performed to protect against data loss, most of data in a given backup has not changed from the previous backup, and may present many opportunities for deduplication to eliminate redundant storage of data.

Data deduplication may operate at the file or block level. File deduplication eliminates duplicate files. Block deduplication looks within a file and saves unique iterations of each block. Block deduplication system operates by dividing a file into a series of chunks. The deduplication system determines whether any of the chunks are already stored, and then proceeds to only store those non-redundant chunks. Redundancy may be checked with chunks in the file being stored or chunks already stored in the system.

An object may be divided into chunks using a fingerprinting technique such as Rabin-Karp fingerprinting. Redundant chunks are detected using a hash function, such as MD5 (Message-Digest Algorithm 5) or SHA-1 (Secure Hash Algorithm 1), on each chunk to produce a hash value for the chunks and then compare those hash values against hash values of chunks already stored on the system. Typically the hash values for stored chunks are maintained in an index (deduplication index). A chunk may be uniquely identified by a hash value and/or digest. If an entry is found for a hash value, then a redundant chunk is identified, and that chunk in the data object or object can be replaced with a pointer to the matching chunk maintained in storage. The deduplication index size may be limited by an amount of memory available for the index. This may limit the number of hash values referencing storage that may be maintained in the deduplication index. Maintaining a smaller size index will help ensure the index can fit into the allocated memory space.

There is a need in the art for improved techniques for performing deduplication operations.

SUMMARY

Provided are a computer program product, system, and method for merging entries in a deduplication index. An index has chunk signatures calculated from chunks of data in the data objects in the storage, wherein each index entry includes at least one of the chunk signatures and a reference to the chunk of data from which the signature was calculated. Entries in the index are selected to merge and a merge operation is performed on the chunk signatures in the selected entries to generate a merged signature. An entry is added to the index including the merged signature and a reference to the chunks in the storage referenced in the merged selected entries. The index of the signatures is used in deduplication operations when adding data objects to the storage.

DETAILED DESCRIPTION

Described embodiments provide techniques for merging entries in a deduplication index to reduce the number of index entries by performing a merge operation on the signatures included in multiple entries to generate a merged signature included in a new merged entry referencing the multiple chunks referenced by the signatures subject to the merge operation. With described embodiments, when processing a received data object to add to storage, chunk signatures are calculated from the chunks in the received data object and merged signatures are calculated from multiple in the received data object to compare with chunk and merged signatures in the deduplication index to determine the non-duplicated or non-matching chunks in the received data object, i.e., one or more chunks having signatures not matching the signatures in the index. Only the non-duplicated or unique chunks are written to storage, and duplicate chunks are not written to avoid writing redundant data.

Figure 1:
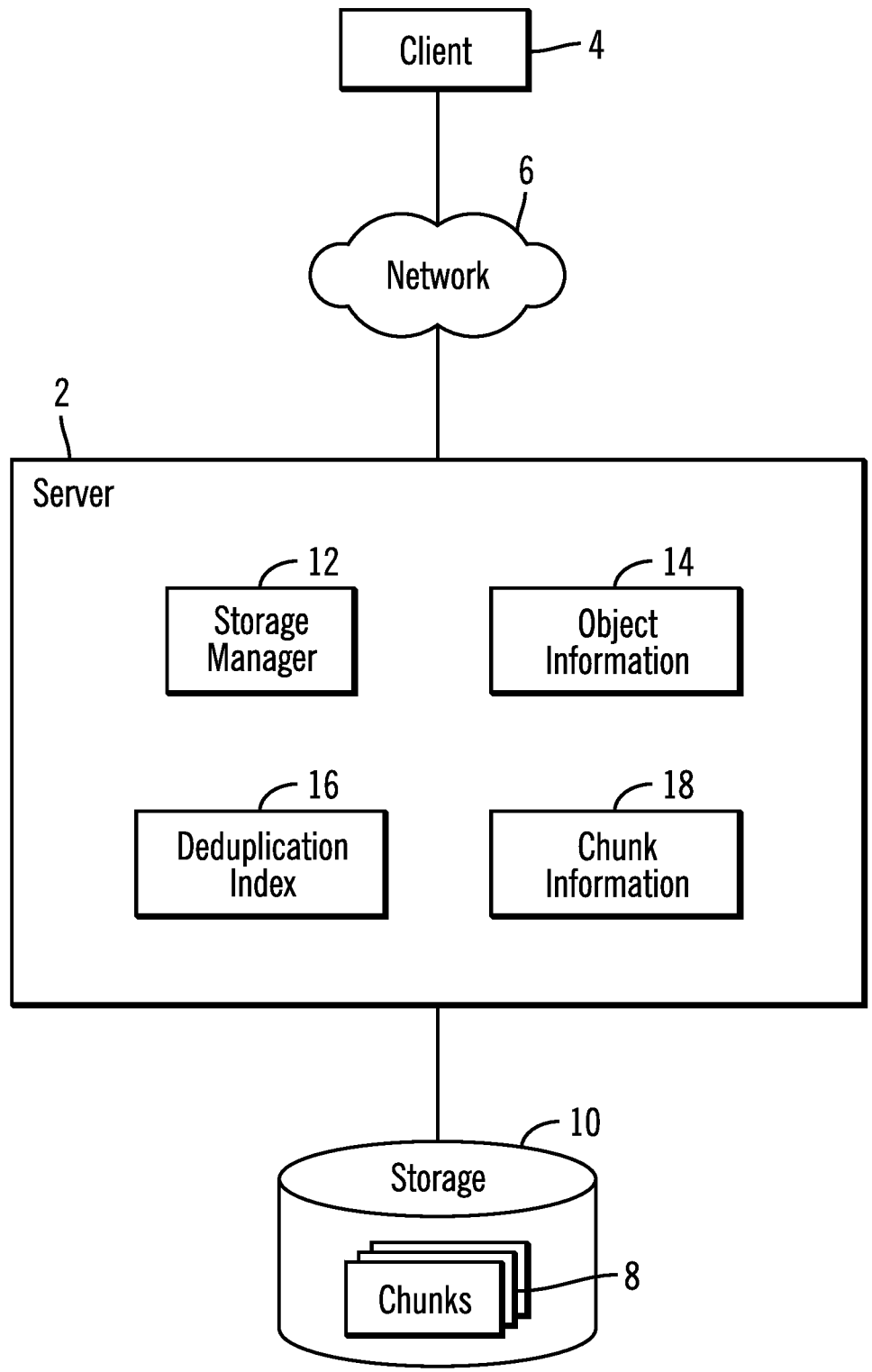
FIG. 1 illustrates a computing environment in which embodiments are implemented.

FIG. 1 illustrates an embodiment of a computing environment having a server 2 that receives and processes data objects from clients 4 over a network 6. The objects are comprised of chunks 8 of data the server 2 stores in a storage 10. The server 2 has a storage manager 12 to manage the storage of data objects in the storage 10. The storage manager 12 maintains object information 14 having information on the objects in the storage 10. The object information 14 may provide an ordered list of chunks 8 and the addresses of those chunks 8 in the storage 10. The objects represented in the object information 14 whose chunks 8 of data are stored in the storage 10 may comprise files, database tables, multimedia content, programs, data sets or any other grouping of data that may be presented for storage. The storage manager 12 may provide storage for active data objects being used by the clients 4 in real time operations and/or may comprise a backup manager backing-up and archiving client 4 data objects.

The storage manager 12 maintains a deduplication index 16 having information on the chunks 8 in the storage 10 to ensure that when storing received data objects having chunks, only one copy of a chunk 8 is stored in the storage 10, i.e., no duplicate copies, although one chunk 8 may be referenced in multiple data objects. The storage manager 12 may further maintain chunk information 18 having information on the location of the chunks 8 in the storage 10. Due to server memory space constraints, the deduplication index 14 may not maintain an entry for each individual chunk 8 in the storage that is referenced in data objects indicated in the object information 14. However, the chunk information 16 maintains information on all the chunks 8 in the storage 10 for use in accessing the chunks 8.

The server 2 may communicate with the clients 4 over a network 6, such as a local area network (LAN), storage area network (SAN), wide area network (WAN), cloud computing model, etc. In further embodiments, the server 2 and client 4 may be connected by a direct cable connection or may comprise components on a single computer system platform, and may communicate over a bus or via memory.

The storage 10 may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc.

The storage manager 12 may comprise a software program in a memory executed by a processor of the server 2. In an alternative embodiment, some portion or all of the storage manager 12 may be implemented in a hardware component, such as a dedicated integrated circuit, e.g., Application Specific Integrated Circuit (ASIC), expansion card, etc.

Figure 2:
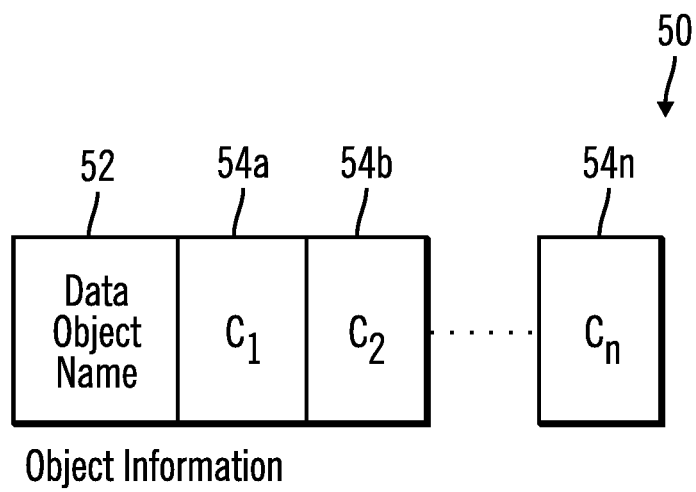
FIG. 2 illustrates an embodiment of object information.

FIG. 2 illustrates an embodiment of an instance of object information 50 for one data object maintained in the object information 14. The object information 50 for one data object includes a data object name 52 assigned to the data object by the client 4, such as a unique identifier name and one or more chunk identifiers ($C_i$) 54a, 54b . . . 54n of chunks assigned to the client data object 52. The actual chunks may be of variable length, i.e., have the same or different lengths, or of a fixed length. The object information 50 may maintain an ordered list of the chunk identifiers ($C_1 \ldots C_n$) indicating the order 1 . . . n in which the chunks appear in the data object.

In one embodiment, the chunk identifier ($C_i$) 54a . . . 54n is calculated by processing the chunk data to generate a unique value for the chunk, such as by using the as MD5 (Message-Digest Algorithm 5) or SHA-1 (Secure Hash Algorithm 1), which calculates cryptographic hashes of chunks in a data object. In an alternative embodiment, the chunk identifier 54a, 54b . . . 54n may comprise a direct reference to a location in the storage 8, and not a hashed value of the data.

Figure 3:
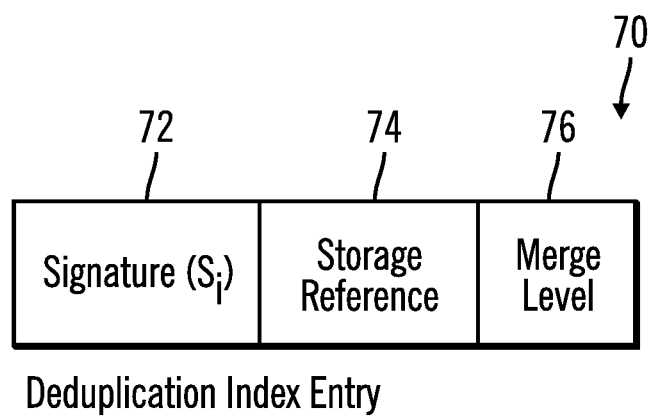
FIG. 3 illustrates an embodiment of a deduplication index entry.

FIG. 3 illustrates an embodiment of a deduplication index entry 70 in the deduplication index 16 for chunks 8 in the storage 10. The entry 70 may reference a single chunk or a plurality of chunks 8 for a merged entry. The index entry 70 includes a signature (Si) 72 which may be calculated from a single chunk 8, such as calculated according to the technique used to calculate the chunk identifiers 54a, 54b . . . 54n, or calculated by performing a merge operation on previously calculated chunk signatures 72 from existing index entries 70, to determine a merged chunk signature. A storage reference 74 references the one or more consecutive chunks 8 in the storage 10 associated with the signature 72. A merge level 76 indicates an extent to which the signature (Si) 72 was calculated directly from a single chunk 8 or calculated from multiple signatures 72 in pre-existing entries 70. For instance, a merge level 76 of zero indicates a chunk signature 72 calculated directly from the chunk 8 data and having a storage reference 74 referencing the chunk 8 from which the signature was calculated. A merge level 76 of one indicates that the signature 72 in the entry 70 is a merged signature calculated by performing the merge operation on two or more first merge level 0 chunk signatures 72, calculated directly from the chunk 8 data. A merge level of n indicates that the chunk signature was calculated from chunk or merged signatures calculated at the (n−1)th merge level or previous merge level. For instance a merge level of two indicates that the merged signatures were calculated from the merged signatures at the first merge level.

In certain embodiments, a merge operation is performed on signatures 72 in entries 70 that reference 74 consecutive chunks 8 in the storage 10, so that the storage reference 74 for the merged signature references consecutive chunks 8.

Figure 4:
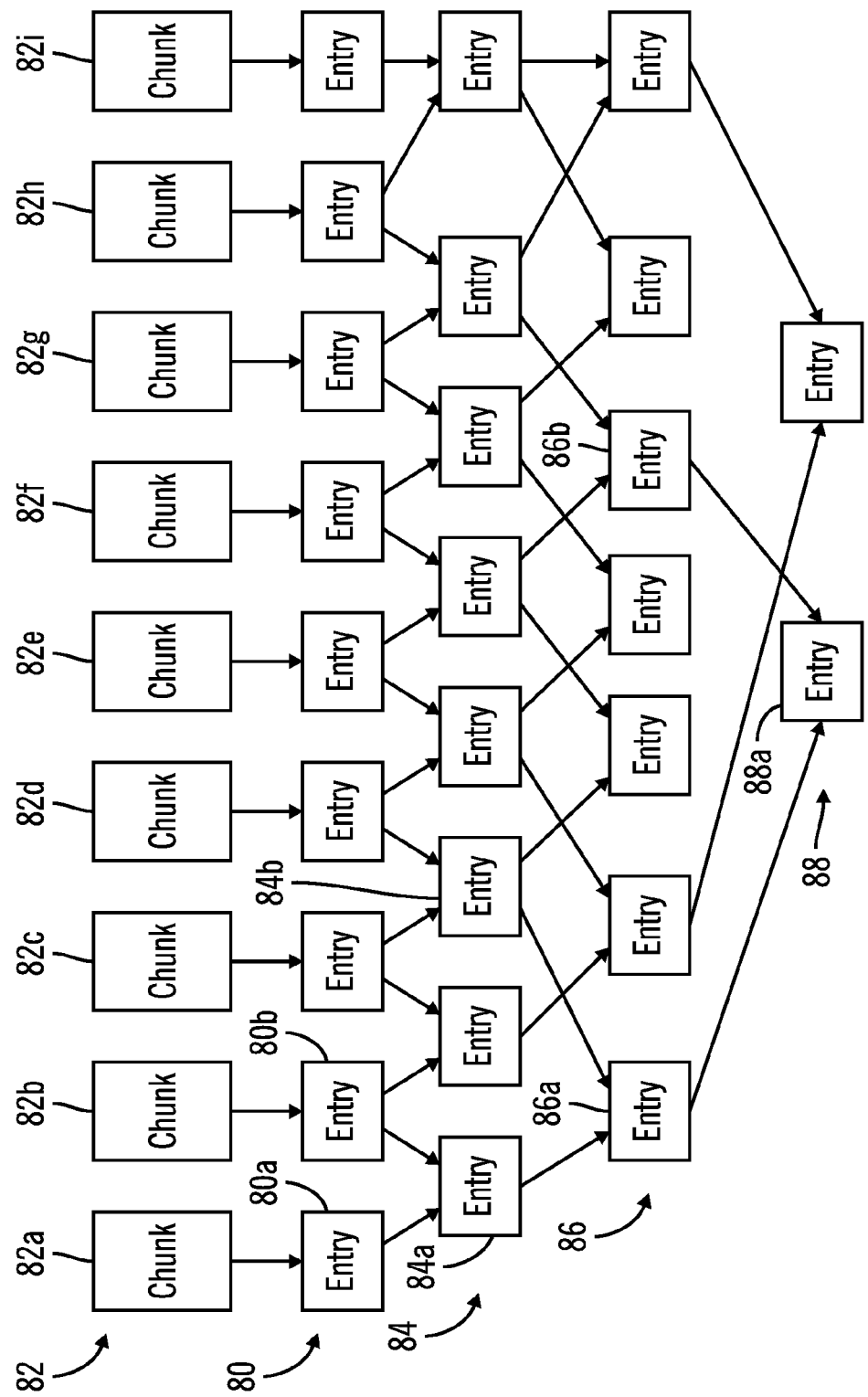
FIG. 4 illustrates an example of a deduplication index having merged entries.

FIG. 4 illustrates an example of entries 70 in the deduplication index 16. The first level of chunk entries 80, merge level 0, are created by calculating the signatures directly from the chunks 82, individually labeled 82a-82i. The second level of merged entries 84, merge level 1, are calculated by performing a merge operation on the signatures of two entries referencing consecutive chunks from the previous merge level 1. The third merge level of entries 86, merge level 2, have merged signatures calculated by performing the merge operation on the merged signature of two entries from the previous second merge level 84 that reference consecutive chunks. Finally, the fourth merge level of entries 88 have merged signatures calculated by performing the merge operation on the entries from the previous level 86 that reference consecutive chunks. In this way each further merge level has entries that consolidate multiple entries referencing consecutive sets of one or more chunks to form a merged entry representing all the consecutive chunks referenced by the multiple entries subject to the merge operation.

For instance, by way of example, deduplication entries 80a and 80b reference chunks 82a and 82b. Entry 84a is formed by merging the signatures in entries 80a and 80b, and entry 84a references consecutive chunks 82a and 82b, referenced by the merged entries 80a and 80b, which entry 84a may replace. Deduplication entry 86a is formed by merging the signatures in entries 84a and 84b, so that entry 86a references consecutive chunks 82a, 82b, 82c, and 82d that are referenced by the merged entries 84a and 84b, which entry 86a may replace. Deduplication entry 88a is formed by merging the signatures in entries 86a and 86b, so that entry 88a references consecutive chunks 82a, 82b, 82c, 82d, 82e, 82f, 82g, and 82h that are referenced by the merged entries 86a and 86b, which entry 88a may replace. In this way, as the deduplication index 16 needs additional space to store deduplication entries 70, space can be freed by merging entries so that the same chunks 8 in the storage 10 are referenced by fewer entries, i.e., signatures.

In the above embodiments, the merge operation involves merging two entries at a prior merge level referencing consecutive chunks. In further embodiments, the merge operation may involve an operation on more than two entries referencing consecutive chunks, so that one merged entry may replace more than two entries to reference the consecutive chunks referenced by the more than two merged entries. Moreover, in certain embodiments, a merge operation may be performed on entries at different levels as long as the entries at different levels reference consecutive chunks.

The merge operation on chunk signatures or merged signatures may comprise a concatenation or other operation. In one embodiment, the merge operation may concatenate two signatures having m and n bytes to form a new merged signature that is m plus n bytes. In further embodiments, additional operations may be performed on the concatenated signatures, such as taking a further hash value, to produce the final merged signature. In yet additional embodiments, the merge operation may involve other suitable types of operations, including, but not limited to, multiplication, etc.

In embodiments where two entries are merged, the number of chunks referenced by an entry at a merge level n, for n=0, 1, 2, 3 . . . may be expressed as $2^n$.

Figure 5:
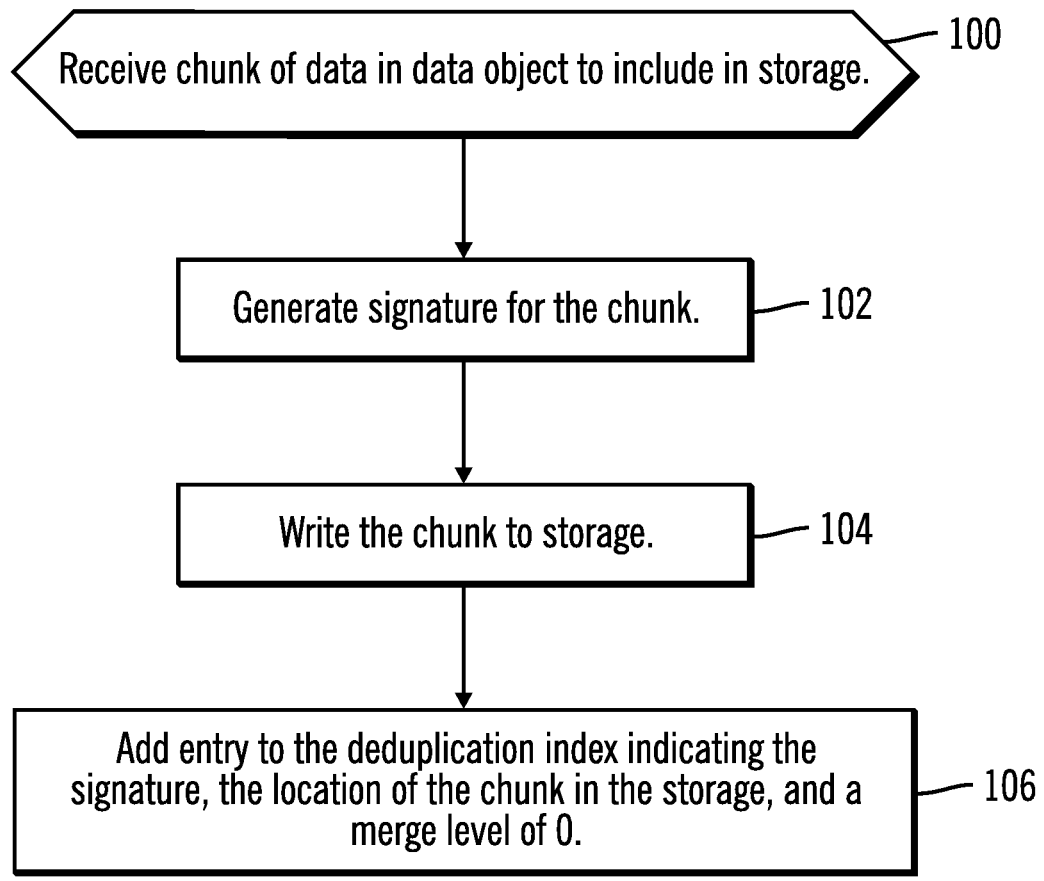
FIG. 5 illustrates an embodiment of operations to add a chunk of data to the deduplication index.

FIG. 5 illustrates an embodiment of operations performed by the storage manager 12 to add a chunk of data from a received data object to the storage 10. A chunk to add may be a variable length chunk determined by applying a fingerprinting algorithm to the data object to determine chunk boundaries, such as the Rabin fingerprinting scheme, or may be a fixed length chunk, such that the boundaries of the chunks in the data object are determined from a fixed length. Upon receiving (at block 100) the chunk to add to the storage 10, the storage manager 12 generates (at block 102) a signature 42 for the chunk and writes (at block 104) the chunk to the storage 10. The storage manager 12 adds (at block 106) an entry 70 to the deduplication index 16 indicating the signature 72, a reference to the chunk written to the storage 10, and a merge level of 0.

Figure 6:
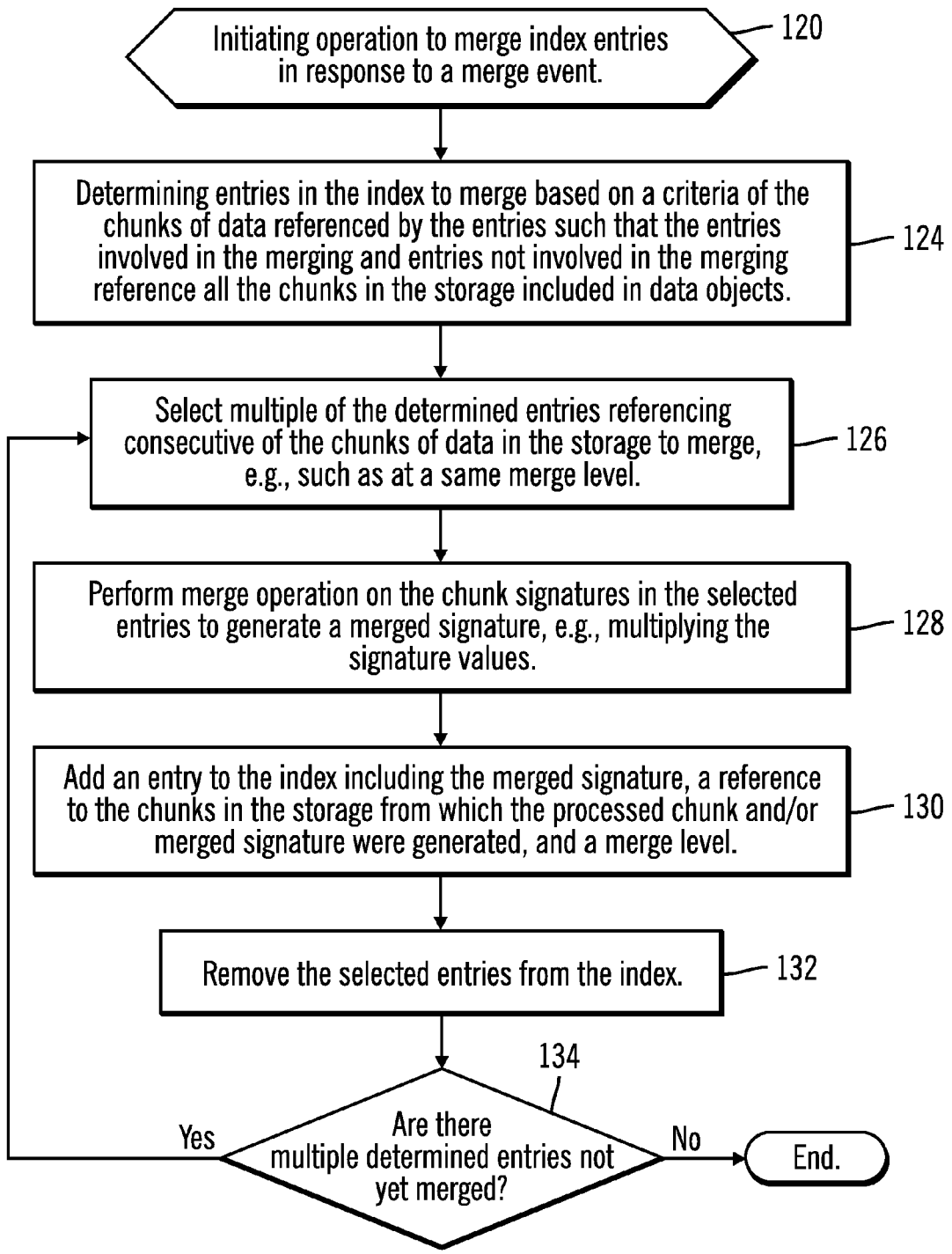
FIG. 6 illustrates an embodiment of operations to merge index entries in the deduplication index.

FIG. 6 illustrates an embodiment of operations performed by the storage manager 12 to merge deduplication index 16 entries 70. The storage manager 12 initiates (at block 120) an operation to merge the index 16 entries 70 in response to an event. For instance, the storage manager 12 may merge entries if the available space in memory of the server 2 reaches a threshold level. Alternatively, the storage manager 12 may periodically merge entries after the index 16 reaches a certain size or after a period of time. Upon initiating (at block 120) the merge operation, the storage manager 14 determines (at block 122) entries 70 in the index 16 to merge based on a criteria of the chunks 8 of data referenced by the entries 70, such that the entries involved in the merging and entries not involved in the merging reference all the chunks 8 in the storage included in data objects 50. The storage manager 12 selects (at block 126) multiple of the determined entries 70, satisfying the criteria, referencing consecutive chunks 8 of data in the storage 10 to merge. The selected entries to merge referencing consecutive chunks may be at the same or different merge levels.

The criteria used to select chunks to merge may comprise an age of the chunks in the storage, such that chunks that have been in storage for a longer duration without being updated are selected to merge before chunks that have been added or updated more recently. Other criteria may be used to select chunks that have a lower desirability, where the desirability of a chunk may be determined by a frequency of Input/Output (I/O) access to the chunks in the storage, such that chunks more frequently accessed are more desirable; a frequency at which the chunks in the storage appear in data objects being added to the storage, such that chunks that appear in more data objects are more desirable; a region of the storage in which the chunks are stored, such that chunks stored in a "hotter" or more frequently accessed region are more desirable; and a type of data in the chunks, where chunks having more critical or more frequently accessed type of data may be considered more desirable.

The storage manager 12 performs (at block 128) a merge operation on the chunk signatures 72 in the selected entries 70 to generate a merged signature. An entry 70 is added (at block 130) to the index 16 including the merged signature 72, a reference 74 to the chunks in the storage 10 from which the processed chunk and/or merged signature were generated, and a merge level 76, which comprises a next level from the merge level of the selected entries subject to the merge operation. The selected entries involved in the merger are removed (at block 132) to free space in the deduplication index 16. If (at block 134) there are multiple determined entries not yet merged, then control proceeds back to block 126 to select further determined entries to merge, else control ends.

Figure 7A:
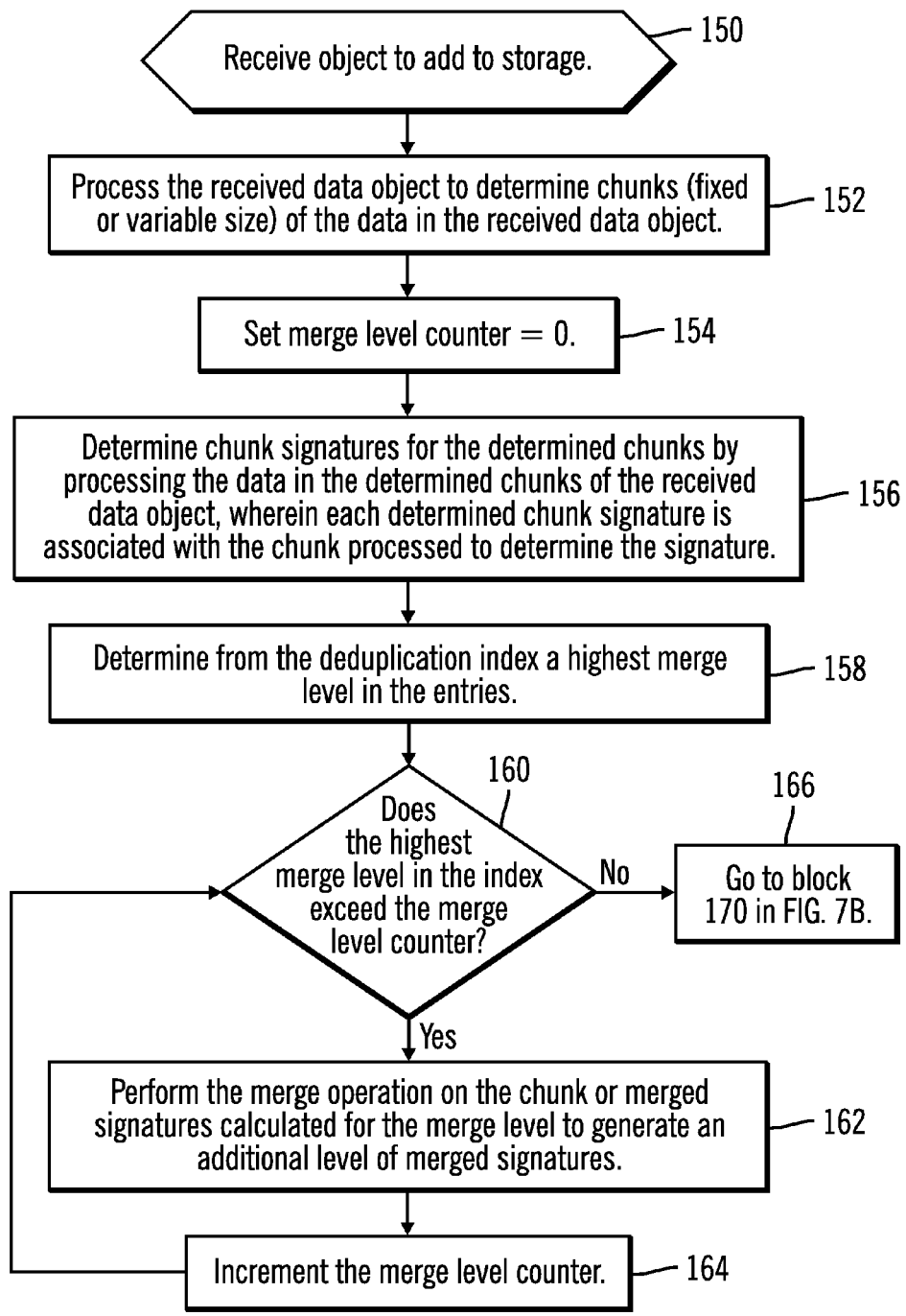
FIGS. 7a and 7b illustrate an embodiment of operations to process a received data object for deduplication by calculating merged signatures.
Figure 7B:
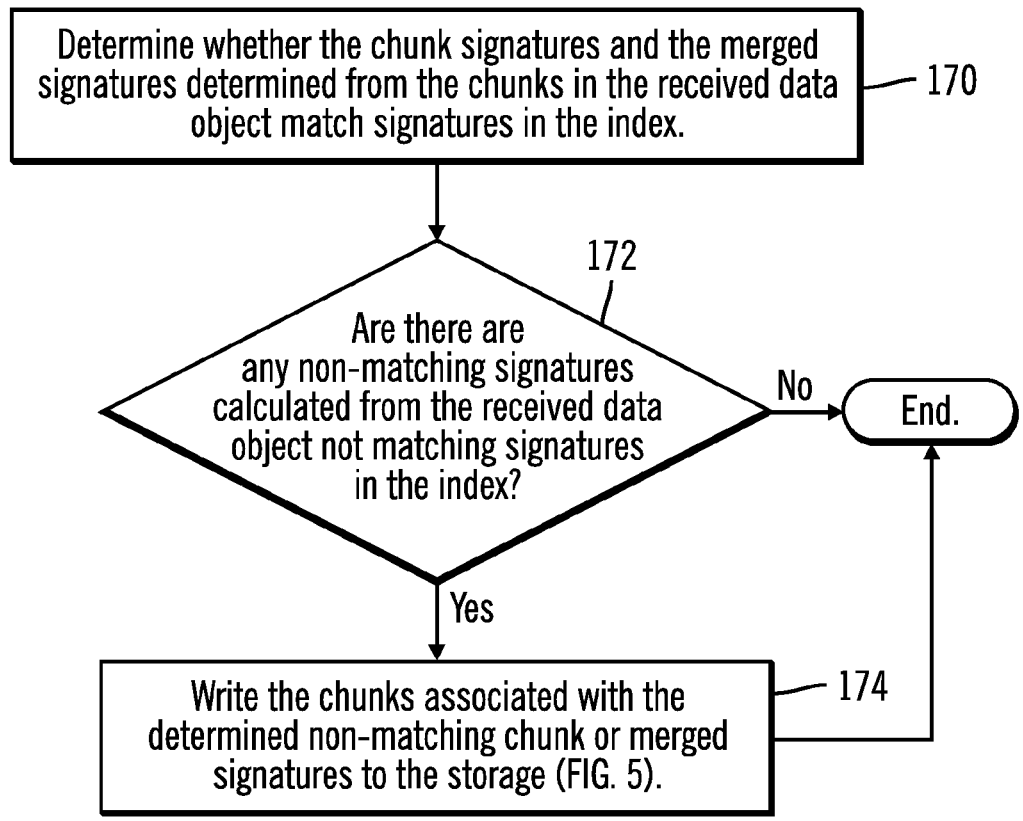
Figure 8:
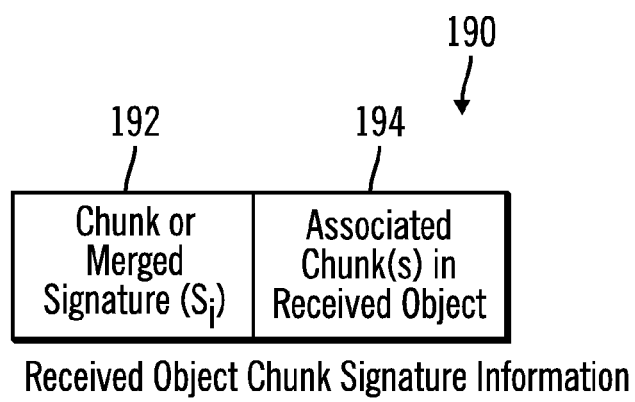
FIG. 8 illustrates an embodiment of an association of chunks in a received data objects with a chunk or merged signature calculated from one or more chunks in the received data object.

FIGS. 7a and 7b illustrate an embodiment of operations performed by the storage manager 12 to process a received data object using the deduplication index 16 to determine non-duplicate chunks in the received data object that need to be added to the storage 10. Upon receiving (at block 150) an object to add to storage 10, the storage manager 12 processes (at block 152) the received data object to determine chunks (fixed or variable size) of the data in the received data object. To determine variable sized chunks, the storage manager 12 may apply a fingerprinting algorithm, such as Rabin fingerprinting. The storage manager 12 may then begin a process to calculate signature values for single chunks and combinations of chunks to compare with the merged signatures 72 for merged entries 70. A merge level counter is set (at block 154) to zero. The storage manager 12 determines (at block 156) chunk signatures for the determined chunks by processing the data in the determined chunks of the received data object, wherein each determined chunk signature is associated with the chunk processed to determine the signature. FIG. 8 shows how the storage manager 12 may maintain received object chunk signature information 190 for each calculated signature 192 and information on the one or more chunks 194 associated with the calculated signature 194.

After determining chunk signatures for each individual chunk in the received object, the storage manager 12 determines (at block 158) from the deduplication index 16 a highest merge level 76 in the entries 70 of the deduplication index 16, i.e., the highest merge level to which signatures have been calculated. If (at block 160) the determined highest merge level exceeds the merge level counter, then the storage manager 12 performs (at block 162) the merge operation on the chunk or merged signatures 190 calculated for the last considered merge level to generate an additional level of merged signatures. The storage manager 12 may perform the same merge operation used to generate the deduplication index 16 in FIG. 6 to generate a merged signature value from at least two other signature values. The merge level counter is incremented (at block 164) and control proceeds back to block 160 to determine whether to calculate a next level of merged signatures from the previously calculated merged signatures at the previous level, as indicated in the merge counter variable. In this way, the storage manager 16 calculates signature values from received data objects to generate chunk signatures from the chunks in the data object and merged signatures calculated by performing the merge operation on previously calculated chunk or merged signatures.

If (at block 160) the determined highest merge level does not the merge level counter, which occurs after generating chunk and merged signatures for the received data object up until the highest merge level in the deduplication index 16, then control proceeds (at block 166) to block 170 in FIG. 7b. The storage manager 12 determines (at block 170) whether the chunk signatures and the merged signatures determined from the chunks in the received data object match signatures 72 in the entries 70 of the deduplication index 16. A match indicates that the chunks in the received data object associated with chunk or merged signature are duplicates of consecutive chunks 8 already stored in the storage 10 and a non-matching signature indicates that the chunks associated with the non-matching chunk or merged signature are no duplicates of data stored in the storage 10. If (at block 172) there are any non-matching signatures, calculated from the chunks or merged signatures of the received data object, not matching signatures in the index 16, then the chunks in the received data object associated with the determined non-matching signatures are written (at block 174) to the storage 10 according to the operations of FIG. 5. Chunks in the received data object associated with the chunk and merged signatures that match the signatures in the index are not written to the storage 10 because they are duplicates of data already in the storage 10.

With the described embodiments, deduplication index entries are consolidated to free space in the index and allow chunks in the storage to remain referenced in combination with other chunks by a merged signature in the deduplication index. If deduplication index space needs to be limited, the described embodiments allow chunks to remain represented in the deduplication index for use in avoiding writing duplicate data to storage. In certain embodiments, deduplication index entries referencing less frequently accessed chunks may be merged to free space in the deduplication index to reference newly added chunks to the storage, yet allow those less frequently accessed consecutive chunks to be referenced by index entries for deduplication.

The described embodiments of maintaining the deduplication index 16 and merging entries may be performed at the server 2 when receiving data objects from the clients 4. Alternatively, the clients 4 may maintain the deduplication index 16 of data in the storage 10 to use to minimize the amount of chunks that are transferred to the server 4 to store in the storage 10. The client 4 may use the deduplication index 16 to determine chunks in a data object that are duplicates of chunks in the storage 10 by using the operations of FIGS. 7a and 7b and then substitute for the data the signatures in the index entries for the chunks that are referenced in the deduplication index 16 entries in order to minimize the amount of data transferred over the network 6 to the server 2.

Figure 9:
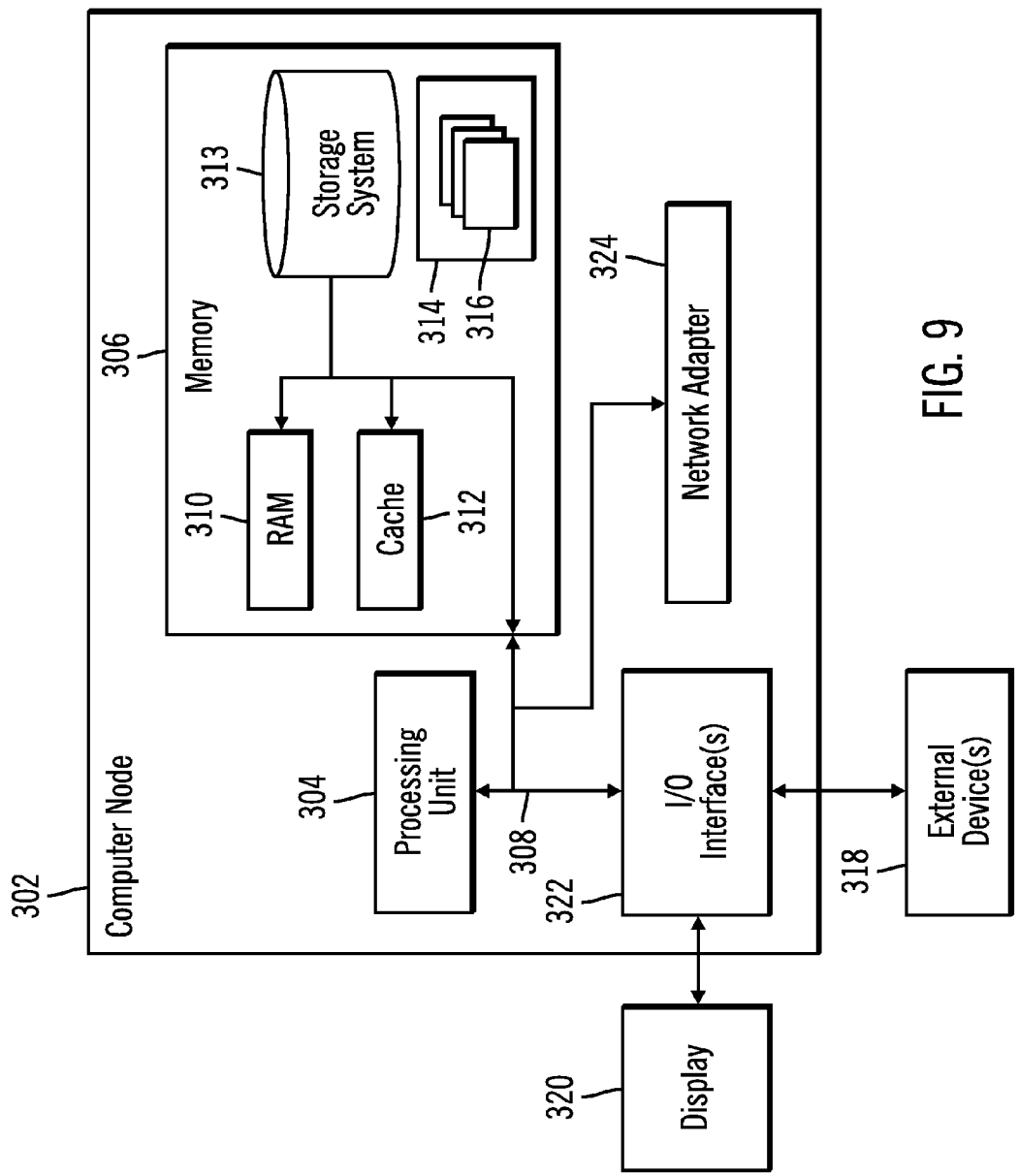
FIG. 9 illustrates an implementation of a computer node in the computing environment.

FIG. 9 illustrates an embodiment of a computer node 302 which may comprise an implementation of the server 2 and client 4 systems. The server 2 and client 4 nodes may be implemented in a cloud computing environment in which the server 2 provides storage and deduplication services to the clients 4. Computer node 302 is only one example of a suitable computing node and is not intended to suggest any limitation as to the scope of use or functionality of embodiments of the invention described herein. Regardless, computer node 302 is capable of being implemented and/or performing any of the functionality set forth hereinabove.

The computer node 302 is operational with numerous other general purpose or special purpose computing system environments or configurations. Examples of well-known computing systems, environments, and/or configurations that may be suitable for use with computer node 302 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 302 may be described in the general context of computer system executable instructions, such as program modules, being executed by a computer system. Generally, program modules may include routines, programs, objects, components, logic, data structures, and so on that perform particular tasks or implement particular abstract data types. Computer node 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 302 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 302 typically includes a variety of computer system readable media. Such media may be any available media that is accessible by computer node 302, and it includes both volatile and non-volatile media, removable and non-removable media, and may be used for storing the object information 14, deduplication index 16, chunk information 18 and storage manager 12 program.

System memory 306 can include computer system readable media in the form of volatile memory, such as random access memory (RAM) 310 and/or cache memory 312. Computer node 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein, such as the operations of the storage manager 12.

Computer node 302 may also communicate with one or more external devices 318 such as a keyboard, a pointing device, a display 320, etc.; one or more devices that enable a user to interact with the computer node 302; and/or any devices (e.g., network card, modem, etc.) that enable computer system/server 302 to communicate with one or more other computing devices. Such communication can occur via Input/Output (I/O) interfaces 322. Still yet, computer node 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The variable "n" is used to represent a variable positive integer number of an element, such as variable number of chunk identifiers in object information, variable number of merge levels, etc. These variables associated with different elements may comprise a same or different integer value.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing deduplication for a storage, the computer program product comprising a computer readable storage device having computer readable program code embodied therein that executes to perform operations, the operations comprising:
   maintaining an index of chunk signatures calculated from chunks of data in the data objects in the storage, wherein each index entry includes at least one of the chunk signatures and a reference to the chunk of data from which the signature was calculated;
   selecting entries in the index to merge by determining entries of the entries in the index based on a criteria of the chunks of data referenced in the entries, wherein the criteria comprises at least one of: an age of the chunks in the storage, wherein the age comprises a duration of time since the chunk was added or updated in the storage; a frequency of Input/Output (I/O) access to the chunks in the storage; a frequency at which the chunks in the storage appear in data objects being added to the storage; a region of the storage in which the chunks are stored; and a type of data in the chunks;
   performing a merge operation on the chunk signatures in the selected entries to calculate a merged signature;
   adding an entry to the index including the merged signature and a reference to the chunks in the storage referenced in the merged selected entries;
   removing the selected entries used to calculate the merged signature from the index, wherein the resulting merged entries and entries not involved in the merging operation reference all the chunks in the storage included in the data objects maintained in the storage; and
   using the index of the signatures in deduplication operations when adding data objects to the storage.

2. The computer program product of claim 1, wherein the selected entries include references to consecutive chunks of data in the storage.

3. The computer program product of claim 1, wherein the signatures in each of the selected entries comprise at least one of a signature calculated from the chunk in the storage and a merged signature generated by processing previously selected signatures.

4. The computer program product of claim 1, wherein the merge operation comprises concatenating the signatures in the selected entries.

5. A computer program product for performing deduplication for a storage, the computer program product comprising a computer readable storage device having computer readable program code embodied therein that executes to perform operations, the operations comprising:
   maintaining an index of chunk signatures calculated from chunks of data in the data objects in the storage, wherein each index entry includes at least one of the chunk signatures and a reference to the chunk of data from which the signature was calculated;
   selecting entries in the index to merge;
   performing a merge operation on the chunk signatures in the selected entries to calculate a merged signature;
   adding an entry to the index including the merged signature and a reference to the chunks in the storage referenced in the merged selected entries;
   removing the selected entries used to calculate the merged signature from the index; and
   using the index of the signatures in deduplication operations when adding a received data object to the storage by:
      processing the received data object to determine chunks of the data in the received data object;
      determining chunk signatures for the determined chunks by processing the data in the determined chunks of the received data object, wherein each determined chunk signature is associated with the chunk processed to determine the signature;
      determining merged signatures by performing the merge operation on the chunk signatures for consecutive of the determined chunks in the received data object, wherein each determined merged signature is associated with the chunks processed to determine the chunks signatures processed to determine the merged signature;

determining whether any of the chunk signatures and the merged signatures, associated with the chunks in the received data object, match signatures in the index;

determining whether there are non-matching chunk or merged signatures calculated from the received data object that do not match the signatures in the index; and storing the chunks associated with the non-matching chunk or merged signatures chunks in the received data object in the storage, wherein chunks in the received data object associated with the determined chunk and merged signatures that match the signatures in the index are not written to the storage.

6. The computer program product of claim 5, wherein in the index, the merged signatures generated from the chunk signatures define a first merge level, wherein the merged signatures determined from the chunk signatures from the received data object comprise a first merge level of received object merged signatures, wherein the operations further comprise:

maintaining in the index entries at least one additional merge level of merged signatures, wherein each additional merge level of merged signatures is formed by processing the merged signatures in entries indicating a preceding merge level; and for each additional merge level, generating an additional merge level of received object merged signatures by performing the merge operation on the received object merged signatures in at least one preceding merge level, wherein the determination of matching merged signatures considers the merged signatures generated from the received data object for all the merge levels in the index.

7. A system for performing deduplication for a storage, comprising:

a processor; and a computer readable storage medium having programmable code executed by the processor to perform operations, the operations comprising:

maintaining an index of chunk signatures calculated from chunks of data in the data objects in the storage, wherein each index entry includes at least one of the chunk signatures and a reference to the chunk of data from which the signature was calculated;

selecting entries in the index to merge by determining entries of the entries in the index based on a criteria of the chunks of data referenced in the entries, wherein the criteria comprises at least one of: an age of the chunks in the storage, wherein the age comprises a duration of time since the chunk was added or updated in the storage; a frequency of Input/Output (I/O) access to the chunks in the storage; a frequency at which the chunks in the storage appear in data objects being added to the storage; a region of the storage in which the chunks are stored; and a type of data in the chunks;

performing a merge operation on the chunk signatures in the selected entries to calculate a merged signature;

adding an entry to the index including the merged signature and a reference to the chunks in the storage referenced in the merged selected entries;

removing the selected entries used to calculate the merged signature from the index, wherein the resulting merged entries and entries not involved in the merging operation reference all the chunks in the storage included in the data objects maintained in the storage; and using the index of the signatures in deduplication operations when adding data objects to the storage.

8. The system of claim 7, wherein the selected entries include references to consecutive chunks of data in the storage.

9. The system of claim 7, wherein the signatures in each of the selected entries comprise at least one of a signature calculated from the chunk in the storage and a merged signature generated by processing previously selected signatures.

10. The system of claim 7, wherein the merge operation comprises concatenating the signatures in the selected entries.

11. A system for performing deduplication for a storage, comprising:

a processor; and a computer readable storage medium having programmable code executed by the processor to perform operations, the operations comprising:

maintaining an index of chunk signatures calculated from chunks of data in the data objects in the storage, wherein each index entry includes at least one of the chunk signatures and a reference to the chunk of data from which the signature was calculated;

selecting entries in the index to merge;

performing a merge operation on the chunk signatures in the selected entries to calculate a merged signature;

adding an entry to the index including the merged signature and a reference to the chunks in the storage referenced in the merged selected entries;

removing the selected entries used to calculate the merged signature from the index; and using the index of the signatures in deduplication operations when adding a received data object to the storage by:

processing the received data object to determine chunks of the data in the received data object;

determining chunk signatures for the determined chunks by processing the data in the determined chunks of the received data object, wherein each determined chunk signature is associated with the chunk processed to determine the signature;

determining merged signatures by performing the merge operation on the chunk signatures for consecutive of the determined chunks in the received data object, wherein each determined merged signature is associated with the chunks processed to determine the chunks signatures processed to determine the merged signature;

determining whether any of the chunk signatures and the merged signatures, associated with the chunks in the received data object, match signatures in the index;

determining whether there are non-matching chunk or merged signatures calculated from the received data object that do not match the signatures in the index; and storing the chunks associated with the non-matching chunk or merged signatures chunks in the received data object in the storage, wherein chunks in the received data object associated with the determined chunk and merged signatures that match the signatures in the index are not written to the storage.

12. The system of claim 11, wherein in the index, the merged signatures generated from the chunk signatures define a first merge level, wherein the merged signatures determined from the chunk signatures from the received data object comprise a first merge level of received object merged signatures, wherein the operations further comprise:

maintaining in the index entries at least one additional merge level of merged signatures, wherein each additional merge level of merged signatures is formed by processing the merged signatures in entries indicating a preceding merge level; and for each additional merge level, generating an additional merge level of received object merged signatures by performing the merge operation on the received object merged signatures in at least one preceding merge level, wherein the determination of matching merged signatures considers the merged signatures generated from the received data object for all the merge levels in the index.

13. A method for performing deduplication for a storage, comprising:

maintaining an index of chunk signatures calculated from chunks of data in the data objects in the storage, wherein each index entry includes at least one of the chunk signatures and a reference to the chunk of data from which the signature was calculated;

selecting entries in the index to merge by determining entries of the entries in the index based on a criteria of the chunks of data referenced in the entries, wherein the criteria comprises at least one of: an age of the chunks in the storage, wherein the age comprises a duration of time since the chunk was added or updated in the storage; a frequency of Input/Output (I/O) access to the chunks in the storage; a frequency at which the chunks in the storage appear in data objects being added to the storage; a region of the storage in which the chunks are stored; and a type of data in the chunks;

performing a merge operation on the chunk signatures in the selected entries to calculate a merged signature;

adding an entry to the index including the merged signature and a reference to the chunks in the storage referenced in the merged selected entries;

removing the selected entries used to calculate the merged signature from the index, wherein the resulting merged entries and entries not involved in the merging operation reference all the chunks in the storage included in the data objects maintained in the storage; and using the index of the signatures in deduplication operations when adding data objects to the storage.

14. The method of claim 13, wherein the selected entries include references to consecutive chunks of data in the storage.

15. The method of claim 13, wherein the signatures in each of the selected entries comprise at least one of a signature calculated from the chunk in the storage and a merged signature generated by processing previously selected signatures.

16. The method of claim 13, wherein the merge operation comprises concatenating the signatures in the selected entries.

17. A method for performing deduplication for a storage, comprising:

maintaining an index of chunk signatures calculated from chunks of data in the data objects in the storage, wherein each index entry includes at least one of the chunk signatures and a reference to the chunk of data from which the signature was calculated;

selecting entries in the index to merge;

performing a merge operation on the chunk signatures in the selected entries to calculate a merged signature;

adding an entry to the index including the merged signature and a reference to the chunks in the storage referenced in the merged selected entries;

removing the selected entries used to calculate the merged signature from the index; and using the index of the signatures in deduplication operations when adding a received data object to the storage by:

processing the received data object to determine chunks of the data in the received data object;

determining chunk signatures for the determined chunks by processing the data in the determined chunks of the received data object, wherein each determined chunk signature is associated with the chunk processed to determine the signature;

determining merged signatures by performing the merge operation on the chunk signatures for consecutive of the determined chunks in the received data object, wherein each determined merged signature is associated with the chunks processed to determine the chunks signatures processed to determine the merged signature;

determining whether any of the chunk signatures and the merged signatures, associated with the chunks in the received data object, match signatures in the index;

determining whether there are non-matching chunk or merged signatures calculated from the received data object that do not match the signatures in the index; and storing the chunks associated with the non-matching chunk or merged signatures chunks in the received data object in the storage, wherein chunks in the received data object associated with the determined chunk and merged signatures that match the signatures in the index are not written to the storage.

18. The method of claim 17, wherein in the index, the merged signatures generated from the chunk signatures define a first merge level, wherein the merged signatures determined from the chunk signatures from the received data object comprise a first merge level of received object merged signatures, further comprising:

maintaining in the index entries at least one additional merge level of merged signatures, wherein each additional merge level of merged signatures is formed by processing the merged signatures in entries indicating a preceding merge level; and for each additional merge level, generating an additional merge level of received object merged signatures by performing the merge operation on the received object merged signatures in at least one preceding merge level, wherein the determination of matching merged signatures considers the merged signatures generated from the received data object for all the merge levels in the index.

\* \* \* \* \*